(12) United States Patent
Haas Costa et al.

(10) Patent No.: US 12,353,534 B2
(45) Date of Patent: Jul. 8, 2025

(54) SHARED SECURITY STATES

(71) Applicant: Hewlett-Packard Development Company, L.P., Spring, TX (US)

(72) Inventors: Carlos Haas Costa, Palo Alto, CA (US); Diogo Strube de Lima, Palo Alto, CA (US); Walter Flores Pereira, Palo Alto, CA (US); Andre Dafonte Lopes Da Silva, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 214 days.

(21) Appl. No.: 17/926,964

(22) PCT Filed: Jun. 3, 2020

(86) PCT No.: PCT/US2020/035947
§ 371 (c)(1),
(2) Date: Nov. 21, 2022

(87) PCT Pub. No.: WO2021/247017
PCT Pub. Date: Dec. 9, 2021

(65) Prior Publication Data
US 2023/0195878 A1 Jun. 22, 2023

(51) Int. Cl.
*G06F 21/34* (2013.01)
*G06F 21/43* (2013.01)
*G06F 21/45* (2013.01)

(52) U.S. Cl.
CPC .............. *G06F 21/34* (2013.01); *G06F 21/43* (2013.01); *G06F 21/45* (2013.01)

(58) Field of Classification Search
None
See application file for complete search history.

(56) References Cited

U.S. PATENT DOCUMENTS

| | | | |
|---|---|---|---|
| 8,464,063 B2 | 6/2013 | Agarwal et al. | |
| 8,595,810 B1 | 11/2013 | Ben Ayed | |
| 9,432,361 B2 | 8/2016 | Mahaffey et al. | |
| 9,443,071 B2 | 9/2016 | Horton | |
| 10,057,294 B2 | 8/2018 | Qing | |
| 10,339,293 B2 | 7/2019 | Yang et al. | |
| 2004/0203895 A1* | 10/2004 | Balasuriya | H04M 1/72516 455/456.1 |
| 2012/0015629 A1* | 1/2012 | Olsen | H04M 1/724634 455/411 |
| 2013/0298226 A1* | 11/2013 | Fang | G06F 21/35 726/20 |

(Continued)

FOREIGN PATENT DOCUMENTS

CN 104618389 A 5/2015

*Primary Examiner* — Syed A Roni
(74) *Attorney, Agent, or Firm* — Quarles & Brady LLP (57) ABSTRACT

An example device includes a connection engine to establish a secure connection with a second device. The device includes a security engine to determine a shared security state for the first device and the second device based on a security state of the first device and a security state of the second device. The security engine is to detect a change in the security state of the first device should occur. The security engine is to change the shared security state at the first device. The security engine is to indicate to the second device the change in the shared security state at the first device.

16 Claims, 7 Drawing Sheets

(56) References Cited

U.S. PATENT DOCUMENTS

| | | |
|---|---|---|
| 2014/0189841 A1 | 7/2014 | Metke et al. |
| 2014/0282877 A1* | 9/2014 | Mahaffey ............ H04W 12/33 |
| | | 726/3 |
| 2016/0066184 A1 | 3/2016 | Bhargav-Spantzel et al. |

* cited by examiner

SHARED SECURITY STATES

BACKGROUND

Users may store sensitive information on computing devices or may input sensitive information into computing devices on occasion, for example, to authenticate with a remote service. Users may implement various security features to prevent unauthorized access to the sensitive information. For example, a user may implement an authentication scheme. The user may be authenticated based on something they know (e.g., a password), something they are (e.g., a biometric characteristic), or something they have (e.g., a device). In addition, the computing device may take actions, such as locking after a predetermined time period, to further prevent unauthorized access.

DETAILED DESCRIPTION

A user may interact with various computing devices throughout the day. A security policy may mandate that each device automatically lock when not in use. Because the devices may automatically lock when not in use, the user may authenticate with the various computing devices numerous times throughout the day. Each of the authentication methods previously mentioned may involve some amount of time and inconvenience for the user. Repeated authentication may be annoying and unwelcome disruption to the immediate task being performed by the user.

For example, a user may have a mobile phone and a laptop or desktop computer. While the user is interacting with the laptop or desktop, the mobile phone may automatically lock because it is not in use. The user may then authenticate with the mobile phone to begin using the mobile phone, but the laptop or desktop may lock while the user is interacting with the mobile phone. Once the user wishes to begin using the laptop or desktop again, the user may authenticate with the laptop or desktop. The mobile phone may then lock beginning the cycle anew.

The situation may be especially inconvenient in the context of a multifactor authentication system. A user may use a first computing device to attempt to access a service that uses two-factor authentication. Authentication information may be sent to a second computing device. The user may authenticate with the second computing device to access the authentication information. The user may then input the authentication information from the second computing device into the first computing device. Accordingly, device usability may be improved by making authentication or two-factor authentication more convenient for users.

Figure 1:
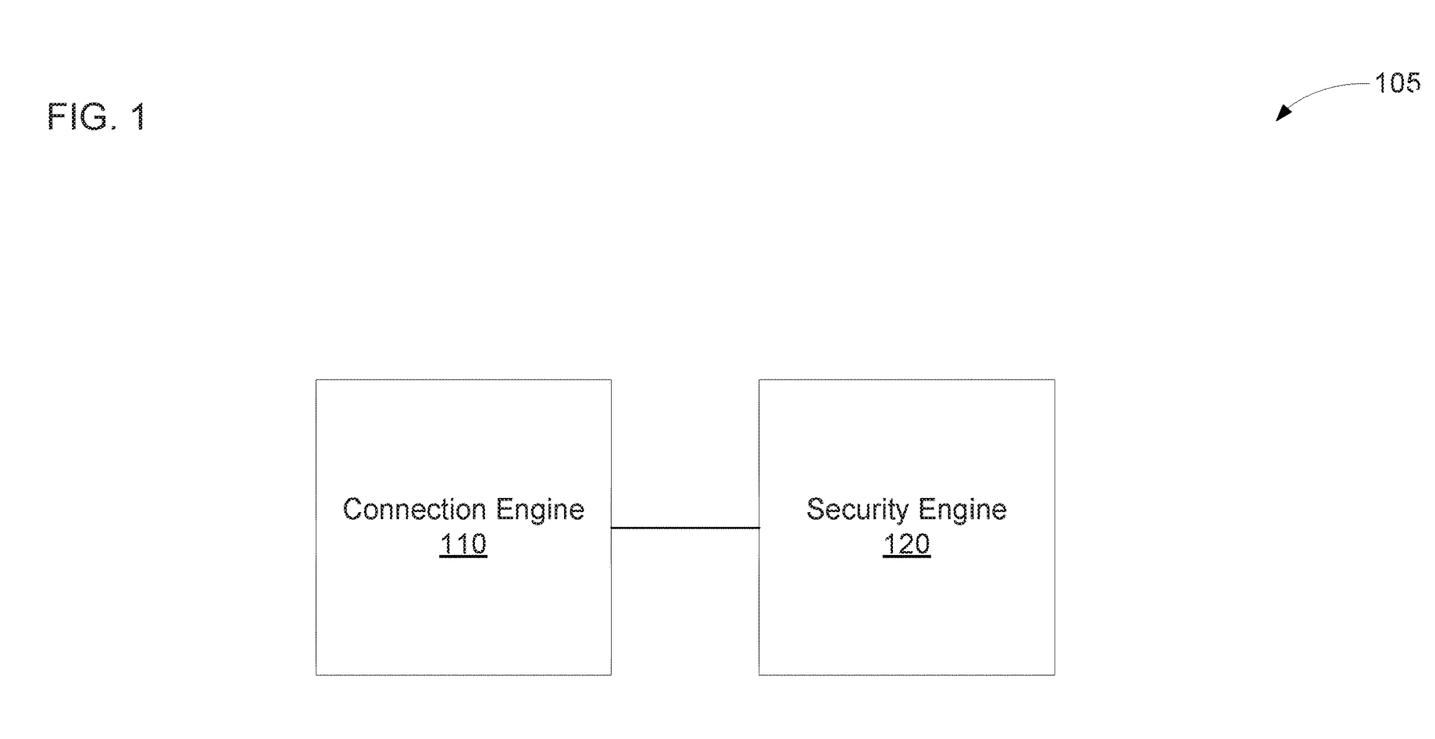
FIG. 1 is a block diagram of an example device to manage a shared security state.

FIG. 1 is a block diagram of an example device 105 to manage a shared security state. The device 105 may be or include a first device. The device 105 may include a connection engine 110 and a security engine 120. As used herein, the term "engine" refers to hardware (e.g., analog or digital circuitry, a processor, such as an integrated circuit, or other circuitry) or a combination of software (e.g., programming such as machine- or processor-executable instructions, commands, or code such as firmware, a device driver, programming, object code, etc.) and hardware. Hardware includes a hardware element with no software elements such as an application specific integrated circuit (ASIC), a Field Programmable Gate Array (FPGA), etc. A combination of hardware and software includes software hosted at hardware (e.g., a software module that is stored at a processor-readable memory such as random-access memory (RAM), a hard-disk or solid-state drive, resistive memory, or optical media such as a digital versatile disc (DVD), and/or executed or interpreted by a processor), or hardware and software hosted at hardware.

The connection engine 110 may establish a secure connection with a second device (not shown). For example, the secure connection may be a wired or wireless protocol. The connection engine 110 may, for example, verify an identity of the second device. The connection engine 110 may also, or instead, establish an encrypted communication channel that prevents spoofing of messages between the connection engine 110 and the second device, prevents eavesdropping on messages, or the like.

The security engine 120 may determine a shared security state for the device 105 and the second device based on a security state of the device 105 and a security state of the second device. As used herein, the term "security state" refers to a device state affecting the amount of access a user has to device functionality or data. For example, the security states may be a secure or unlocked state in which full access is provided to functionality and data and an insecure or locked state in which minimal access is provided (e.g., access to notifications and emergency calls and little else, access to camera functionality but not camera data, etc.). In some examples, the set of potential security states may include more than two states (e.g., a state between secure and insecure with partial access to functionality or data based on moderate confidence a user is present). The security state may reflect user input or sensing by the device. As used herein, the term "shared security state" refers to data relevant to the security state and based on the user input to or sensing of a plurality of devices. The security state of the device 105 may equal the shared security state, may be determined based on the shared security state, or the like.

The security engine 120 may evaluate the security state of the device 105 and the security state of the second device, and the security engine 120 may determine a value for the shared security state based on the evaluation of the individual security states. In some examples, the shared security state may be a state selected from secure, insecure, and no shared state. In other examples, the shared security state may be a state selected from secure and insecure. The number of possible shared security states may depend on the number of possible security states for each device.

The security engine 120 may detect a change in the security state of the device 105 should occur. For example, the security engine 120 may use sensor data in combination with predetermined criteria or a machine learning model to determine that a user is no longer be present or has returned, may determine a timeout period has been reached, may receive authentication information, or the like to determine that the security state of the device 105 should change. The security engine 120 may determine that a more secure state should be entered (e.g., a state that provides more access to a user) or a less secure state should be entered (e.g., a state the provides less access to a user).

The security engine 120 may change the shared security state of the device 105 in response to the detection the change in the security state of the device 105 should occur. For example, the security engine 120 may change the shared security state in a manner corresponding to the manner in which the security state of the device 105 was changed. The security engine 120 may change the shared security state to a more secure state in response to detecting the security state of the device 105 should become more secure. The security engine 120 may change the shared security state to a less secure state in response to detecting the security state of the device 105 should become less secure.

The security engine 120 may indicate to the second device the change in the shared security state at the first device. For example, the security engine 120 may cause the connection engine 110 to transmit an indication of the change to the second device over the secure connection established with the second device. The second device may then be able to adjust its own security state or shared security state based on the indication of the change.

Figure 2:
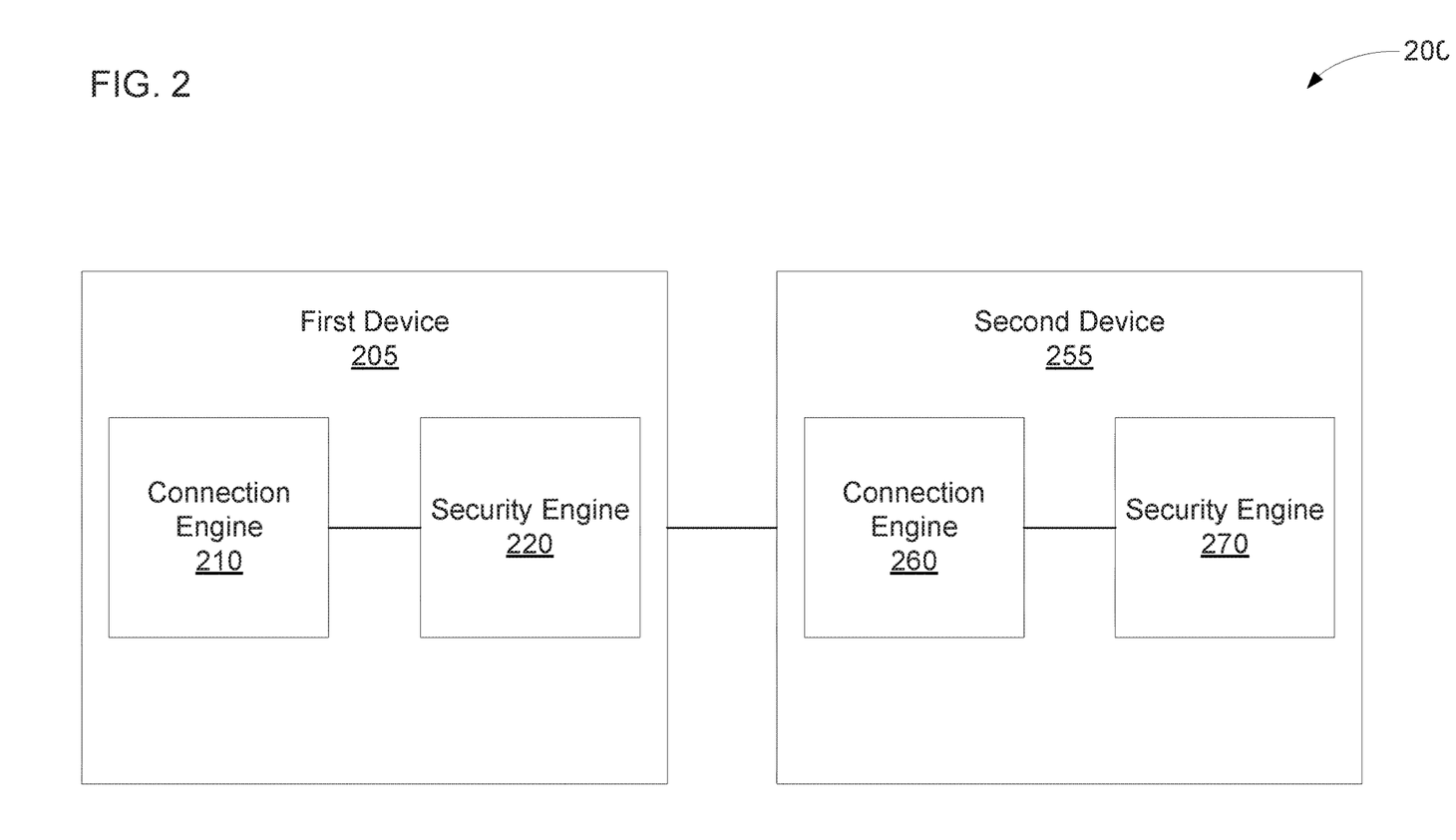
FIG. 2 is a block diagram of an example environment that includes example first and second devices to manage a shared security state.

FIG. 2 is a block diagram of an example environment 200 that includes example first and second devices 205, 255 to manage a shared security state. The first device 205 may include a connection engine 210 and a security engine 220, and the second device 255 may include a connection engine 260 and a security engine 270. The connection engines 210, 260 and the security engines 220, 270 may be examples of the connection engine 110 or the security engine 120 respectively. Although two devices are depicted in the illustrated example, more than two devices may be included in other examples. In examples with more than two devices, there may be one shared security state for all of the devices, or there may be multiple shared security states for multiple groups of devices with some devices present in multiple groups.

The connection engine 210, 260 may establish a secure connection between the first device 205 and the second device 255. (When an engine or device is referred to in the singular with multiple reference numerals, it is intended to cover examples in which the description applies to one device but not both, applies to both devices, or applies to more than two devices, e.g., in examples with more than two devices.) The connection engine 210, 260 may receive data (e.g., a certificate, a signature, etc.) usable to verify the identity of the other connection engine 210, 260. The connection engines 210, 260 may establish an encrypted channel by determining asymmetric or symmetric keys (e.g., using a key exchange protocol) usable to encrypt and decrypt communications.

The connection engines 210, 260 may receive an attestation of capabilities or a configuration of the other device 205, 255. For example, each device 205, 255 may be subject to a security policy (e.g., the same security policy or separate security policies). The security engine 220, 270 may compare the capabilities or configuration of the remote device to the security policy to determine if the remote device 205, 255 satisfies a minimum set of capabilities or minimum configuration sufficient to establish a shared security state. The security engine 220, 270 may determine based on the comparison which transitions in the security state of the remote device 205, 255 should result in a transition of the security state of the security engine 220, 270.

The connection engine 210, 260 may establish a secure connection that ensures the devices 205, 255 are in close proximity to each other. In some examples, the connection engine 210, 260 may establish a secure connection over a wire, such as a direct connection over a wire without a network or intervening nodes between the devices 205, 255. The connection engine 210, 260 may establish the secure connection directly with the other device 205, 255 over a short-range wireless communication protocol, such as a wireless connection without a network or intervening nodes between the devices 205, 255. For example, the wireless communication protocol may be Wi-Fi direct, Bluetooth, NFC, or the like. In some examples, the connection engine 210, 260 may establish a networked or long-range connection. In such examples, the security engine 220, 270 may determine a location of each device to determine whether they remain in close proximity.

The security engine 220, 270 may determine a shared security state for the first device and the second device based on a security state of the first device and a security state of the second device. For example, each device may have an associated security state. The connection engine 210, 260 may receive the security state of the remote device 205, 255 or may transmit the security state of the local device 205, 255. Based on the security states of the devices 205, 255 being the same, the security engine 220, 270 may determine a shared security state that matches the security state of each individual device 205, 255. Based on the security states of the devices 205, 255 not being the same, the security engine 220, 270 may select the less secure state as the shared security state or may select shared security state based on a security policy. For example, the security policy may specify the conditions under which each shared security state should be selected. In some examples, the connection engine 210, 260 may receive the reason for the security state of the remote device 205, 255, and the security engine 220, 270 may select the shared security state based on the reason for the security state of each device 205, 255. For example, if a user recently authenticated on one device 205, 255, the security engine 220, 270 may select a more secure shared security state. If one of the security engines 220, 270 is confident that a user is no longer present, the security engine 220, 270 may select a less secure shared security state.

The security engine 220, 270 may detect a change in the security state of the local device 205, 255 should occur. The security engine 220, 270 may determine that the local device 205, 255 should enter a more secure state. For example, the security engine 220, 270 may receive user input (e.g., a password, a biometric input, etc.) and authenticate the user based on the user input. The security engine 220, 270 may determine that the device 205, 255 is in a trusted location or near a trusted device. The security engine 220, 270 may determine the local device 205, 255 should enter the more secure state based on the user authenticating correctly, or based on the determination the device 205, 255 is in a trusted location or near a trusted device.

The security engine 220, 270 may determine that the local device 205, 255 should enter a less secure state. For example, the security engine 220, 270 may determine the local device 205, 255 should enter the less secure state based on the security engine 220, 270 detecting the device 205, 255 is no longer in a user's pocket, detecting a user is no longer visible to a device camera, detecting a lack of user activity (e.g., a lack of activity for a predetermined time period), detecting the device 205, 255 is no longer in a trusted location or near a trusted device, or the like. The security engine 220, 270 may determine whether the local device 205, 255 should enter a more secure state or a less secure state based on a security policy that specifies the conditions under which a transition should occur.

The security engine 220, 270 may change the shared security state at the local device 205, 255 in response to the detection the change in the security state of the local device 205, 255 should occur. In some examples, the security engine 220, 270 may store an indication of the security state for the local device 205, 255 and store an indication of the shared security state. The security engine 220, 270 may change the stored indications of the shared security state and the security state for local device 205, 255. For example, the security engine 220, 270 may change the shared security state whenever the security engine 220, 270 determines a change to the security state of the local device 205, 255 should occur, or the security engine 220, 270 may determine based on a security policy which changes in the security state of the local device 220, 270 should result in a change to the shared security state. In some examples, the security engine 220, 270 may store an indication of the security state and an indication of whether or not the security state is shared. The security engine 220, 270 may update the indication of the security state and maintain an indication that the security state is shared.

The security engine 220, 270 may indicate to the remote device 205, 255 the change in the shared security state at the local device 205, 255. The security engine 220, 270 may cause the connection engine 210, 260 to transmit an indication of the change in the shared security state at the local device 205, 255. In some examples, the security engine 220, 270 may indicate the reason for the change in the shared security state in addition to the indication of the change. For example, the security engine 220, 270 may indicate how a user authenticated (e.g., password, biometric, etc.), that a trusted location or device was detected, that a lack of user activity was detected, the type of sensor that detected a user was no longer present, that an explicit user request to enter an insecure state was received, or the like. In some examples, either security engine 220, 270 may indicate to the other to change the shared security state.

The security engine 220, 270 receiving the indication to change the shared security state may decide whether a change in the shared security state should occur. The security engine 220, 270 receiving the indication may also, or instead, decide whether a change in a local security state should occur. For example, the security engine 220, 270 receiving the indication may determine whether user activity has been detected, whether the user has authenticated recently, or the like. In some examples, the security engine 220, 270 may indicate it agrees with the decision to change the shared security state, may have acknowledged receipt and provide no responsive communication in response to determining it agrees, or the like. The security engine 220, 270 may transition the shared security state or local security state to an insecure state in response to receiving the indication to change the shared security state. For example, the security engine 220, 270 may transition the shared security state or local security state in response to receiving the indication without evaluating whether it agrees, based on a determination it agrees, or the like.

The security engine 220, 270 may transmit an indication to not change the shared security state (e.g., an indication that it disagrees with the decision to change the shared security state) in response to determining a change to the shared security state should not occur. The security engine 220, 270 may transmit an indication of a reason why it disagrees with the decision to change security state. The connection engine 210, 260 of the other device 205, 255 may receive the indication to not change the security state, which may be responsive to that device 205, 255 previously indicating the change in the shared security state at that device 205, 255. The security engine 220, 270 of that device 205, 255 may revert the change to the shared security state at that device 205, 255 in response to receiving the indication not to change the security state. For example, the security engine 220, 270 may revert the change without evaluating whether it agrees, may revert the change based on a determination it agrees, or the like.

In some examples, the local security state of the security engine 220, 270 may match the shared security state and may not deviate from the shared security state (e.g., in an example where the security state is stored with an indication of whether it is shared). The security engine 220, 270 may determine whether or not the security state should no longer be shared and may indicate when a security state should be reverted but may not otherwise deviate from the shared security state. For example, the security engine 220, 270 may change local/shared security state when it receives an indication to do so, may indicate to the remote device 205, 255 to revert the change to the shared security state, or may decide the security state should no longer be shared.

In some examples, the local security state of the security engine 220, 270 may be independent of the shared security state. Each security engine 220, 270 may decide whether the local security state should match the shared security state. For example, the shared security state may be an insecure state in response to one of the security engines 220, 270 deciding the shared security state should be insecure. The other security engine 220, 270 may update a local version of the shared security state, but that security engine 220, 270 may decide whether to change the local security state based on the update to the local version of the shared security state. For example, the security engine 220, 270 may decide that there has been recent enough user activity or authentication to maintain the local security state in a secure state. In some examples, while the shared security state may be the same for both security engines 220, 270, the local security states may deviate from each other.

In some examples, the security engine 220, 270 may determine the local or shared security state based on a security policy. There may be a single security policy that covers both devices, separate security polices for each device (e.g., separate security policies from a single organization or from different organizations), or the like. For example, the security policy that applies to the local device 205, 255 may not apply to the remote device 205, 255. The security policy may specify how to handle potential disagreements between the devices 205, 255 over the shared security state or how to handle disagreements between the local and shared security state. For example, where the security engines 220, 270 have sensed different information regarding whether a user is present, the amount of user activity, etc., the security policy (e.g., a security policy applicable to both devices) may specify whether the different information should result in the shared security state being secure or insecure. The security policy may specify whether the security engine 220, 270 should accept a change in the shared security state despite conflicting local data or whether the security engine 220, 270 should indicate disagreement to the change to the remote device 205, 255. Under a security policy applicable to both devices, the security engine 220, 270 may revert the security state in response to receiving an indication of disagreement, for example, without evaluating the reasons for the disagreement.

In some examples, the security engine 220, 270 may decide whether to change a local security state based on an update to the shared security state and based on a security policy. The security policy may specify minimum sensing capabilities of the remote device 205, 255 or a minimum amount of sensed data from the remote device to produce a change in the local security state. The security policy may specify whether the security engine 220, 270 should change the local security state in response to a change in the shared security state, whether the security engine 220, 270 should maintain the local security state despite a change in the shared security state to a different value, or whether the security engine 220, 270 indicate disagreement to the change to the remote device 205, 255. In some examples, the security engine 220, 270 may indicate to the remote device 205, 255 whenever it decides the local security state should disagree with the shared security state, e.g., based on the security policy applicable to the security engine 220, 270. The security engine 220, 270 of the remote device 205, 255 may determine whether or not to revert its change to its local security state or the shared security state based on the indication of disagreement, e.g., based on a security policy application to the security engine 220, 270 of the remote device 205, 255. Once each security engine 220, 270 has evaluated any disagreements indicative of information available to other security engines 220, 270, the security engines 220, 270 may settle on a shared security state, which may be the least secure local security state of any of the security engines 220, 270. The local security states of the security engines 220, 270 may be different from the shared security state on which the security engines 220, 270 settled.

The security policy may also map local security states to shared security states. For example, each security engine 220, 270 may have a different number of possible local security states from the other security engine 220, 270, or the number of possible shared security states may be different from the number of possible local security states for either security engine 220, 270. The security policy may specify how many possible shared security states should be used and may indicate which possible local security states correspond to each possible shared security state.

The secure connection between the devices 205, 255 may become disconnected or reset to an insecure state. The connection engine 210, 260 may detect a loss of the secure connection with the remote device 205, 255. For example, the connection engine 210, 260 may periodically or aperiodically check the state of the connection. The connection engine 210, 260 may check the state of the connection in response to the security engine 220, 270 detecting a change in the local security state should occur. The security engine 220, 270 may change the shared security state to indicate the loss of the secure connection. The security engine 220, 270 may change the shared security state to disconnected in examples with a disconnected state, change the shared security state to an insecure state in examples without a disconnected state, change an indication of whether or not the security state is shared to no in examples with such an indication, or the like. The security engine 220, 270 may also select a local security state. For example, the security engine 220, 270 may retain the previous state, select an intermediate state of potentially insecure, enter an insecure state, or the like. In the potentially insecure state, the security engine 220, 270 may have a reduced timeout or may independently evaluate whether the user is present. The security engine 220, 270 may select the local security state based on recent sensor data (e.g., recent sensor data indicative of user activity, whether a user is present, whether the device is in a user's pocket, whether the device is in a trusted location or near a trusted device, etc.).

The security engine 220, 270 may also, or instead, periodically check whether the conditions for maintaining a shared security state are met. For example, the security engine 220, 270 may confirm that the devices 205, 255 remain proximate to each other, e.g., in an example where the devices 205, 255 are connected by a network or long-range communication protocol. The security engine 220, 270 may periodically or aperiodically confirm the security state of the remote device 205, 255, may periodically or aperiodically request that the connection engine 210, 260 confirm the secure connection remains, or the like. In some examples, the security engine 220, 270 may confirm the conditions for maintaining the shared security state are met each time an inactivity timer expires, periodically without use of an inactivity timer, or the like.

Either of the devices 205, 255 may enter a power saving state while in the shared security state is in a secure state. For example, the device 205, 255 may turn off the screen or transition to a lock screen. When the user attempts to access the device, the security engine 220, 270 may confirm the shared security state is still in a secure state. The security engine 220, 270 may permit the user to access the device 205, 255 without authenticating the user. The security engine 220, 270 may transition from the lock screen to full access in response to confirming the shared security state is still in the secure state without requesting that the user authenticate.

The security engine 220, 270 may automatically handle a multifactor authentication request without user input on a second device. The connection engine 210, 260 may receive a multifactor authentication request. For example, a user of the local device 205, 255 may be attempting to access a service, and the service may request that the local device provide a code sent to the remote device 205, 255. The security engine 220, 270 may confirm the secure connection remains established. For example, the security engine 220, 270 may cause the connection engine 210, 260 to determine whether the devices 205, 255 are still connected by an encrypted channel. The security engine 220, 270 may confirm that the shared security state is in a secure state. For example, the security engine 220, 270 may check the locally stored version of the shared security state, may cause the connection engine 210, 260 to confirm the shared security state with the remote device 205, 255, or the like. In some examples, the security engine 220, 270 may confirm the secure connection remains established without confirming the shared security state is in a secure state.

The security engine 220, 270 may respond to the multifactor authentication request without user input based on the confirming. For example, the local security engine 220, 270 may request that the remote security engine 220, 270 provide a response (e.g., a code) to be provided to the service in response to the multifactor authentication request. The remote security engine 220, 270 may transmit the response to the local security engine 220, 270, which may receive the response. In some examples, the remote security engine 220, 270 may confirm the secure connection remains established or that the shared security state is in a secure state prior to providing the response. The local security engine 220, 270 may transmit the response to the service that provided the multifactor authentication request. The local security engine

220, 270 may not automatically respond to the multifactor authentication request if the secure connection has become disconnected or if the shared security state is in an insecure state.

Figure 3:
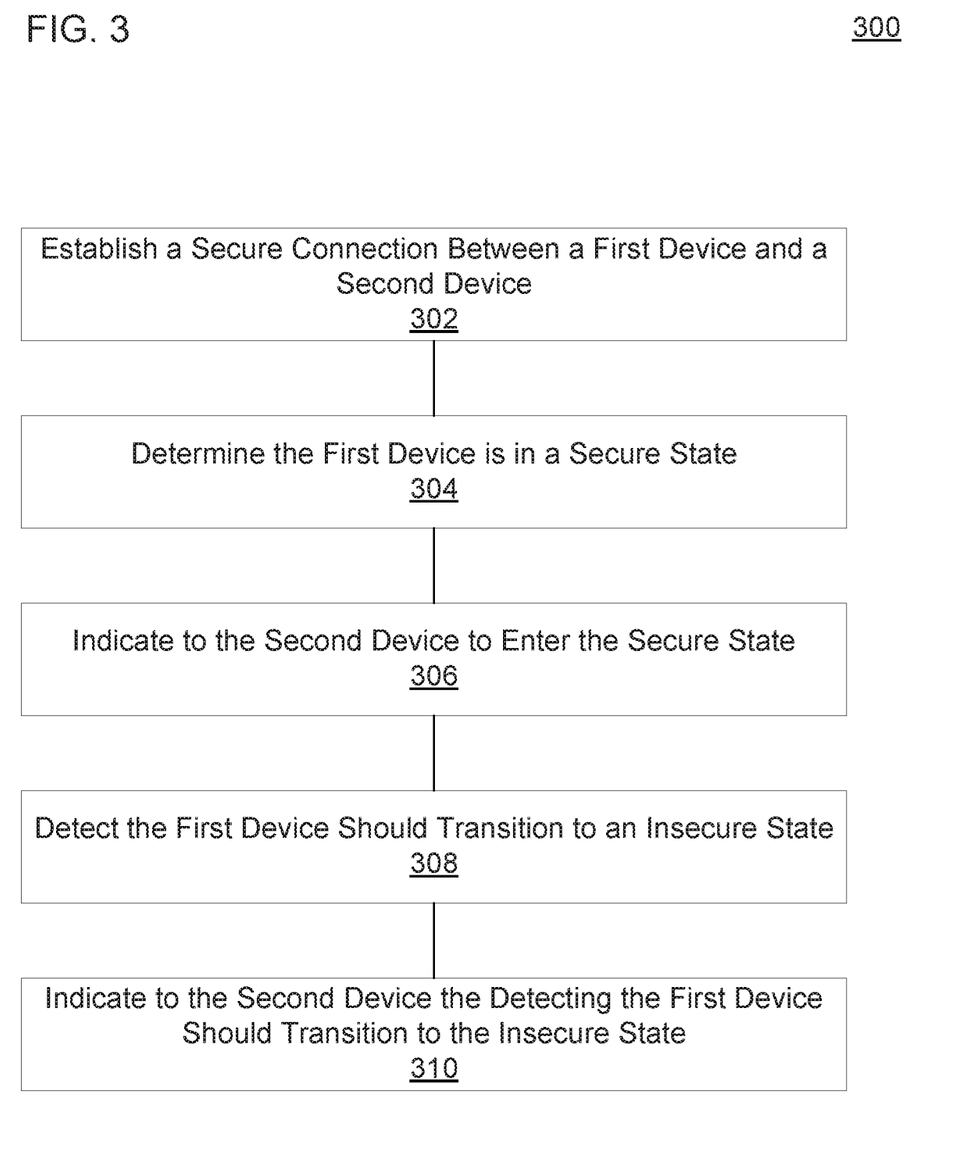
FIG. 3 is a flow diagram of an example method to manage a shared security state.

FIG. 3 is a flow diagram of an example method 300 to manage a shared security state. A processor may perform elements of the method 300. For illustrative purposes, the method 300 is described in connection with the device of FIG. 1. However, other devices may perform the method in other examples. At block 302, the method 300 may include establishing a secure connection between a first device and a second device. For example, the connection engine 110 of may establish a secure connection in any of the manners previously discussed.

Block 304 may include determining the first device is in a secure state. For example, the security engine 120 may determine a user has authenticated or the first device is in trusted location or near a trusted device, may check a stored indication of the security state, or the like. At block 306, the method 300 may include indicating to the second device to enter the secure state based on the determining the first device is in the secure state. For example, the security engine 120 may cause the connection engine 110 to transmit an indication to the second device that the first device is in the secure state.

Block 308 may include detecting the first device should transition to an insecure state. For example, the security engine 120 may detect the first device should transition in any of the manners previously discussed. At block 310, the method 300 may include indicating to the second device the detecting the first device should transition to the insecure state. For example, the security engine 120 may cause the connection engine 110 to indicate the detecting in any of the manners previously discussed.

Figure 4:
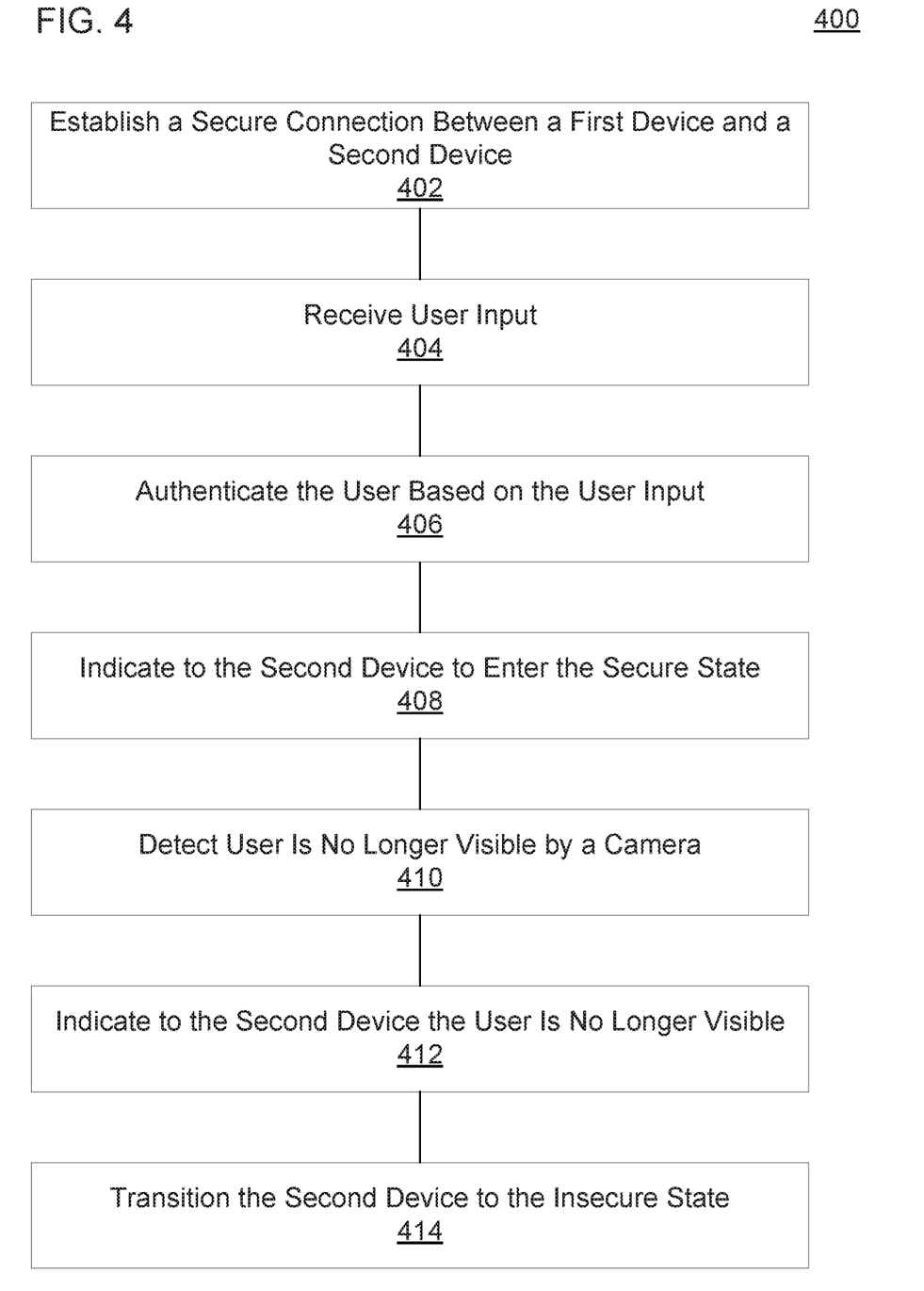
FIG. 4 is a flow diagram of another example method to manage a shared security state.

FIG. 4 is a flow diagram of another example method 400 to manage a shared security state. A processor may perform elements of the method 400. For illustrative purposes, the method 400 is described in connection with the devices of FIG. 2. However, other devices may perform the method in other examples. At block 402, the method 400 may include establishing a secure connection between a first device and a second device. The connection engine 210 may establish the secure connection in any of the manners previously discussed.

Block 404 may include receiving user input. For example, the security engine 220 may receive a password, a biometric input, or the like from the user. At block 406, the method 400 may include authenticating a user based on the user input. For example, the security engine 220 may confirm that the password or biometric input matches a stored representation of the password or biometric input (e.g., matches the stored representation beyond a predetermined threshold).

Block 408 may include indicating to the second device to enter the secure state based on the determining the first device is in the secure state. For example, the security engine 220 may cause the connection engine 210 to indicate to the second device to enter the secure state in any of the manners previously discussed. At block 410, the method 400 may include detecting a user is no longer visible by a camera. In other examples, the method 400 may include detecting the first device should transition to an insecure state for other reasons, such as detecting the first device is no longer in a user's pocket, detecting a lack of user activity, or the like. The security engine 220 may detect the user is no longer visible by the camera by analyzing an image to determine whether a face is present, whether a face that matches a stored representation of the user's face is present, or the like.

The security engine 220 may detect the first device is no longer in a user's pocket by detecting a camera image increases in brightness above a threshold. The security engine 220 may detect a lack of user activity by detecting a lack of movement of the device, a lack of user input, or the like.

Block 412 may include indicating to the second device the detecting the user is no longer visible. For example, the security engine 220 may cause the connection engine 210 to indicate the detecting in any of the manners previously discussed for indicating to the second device the detecting the first device should transition to the insecure state. At block 414, the method 400 may include transitioning the second device to the insecure state based on the indicating to the second device the detecting the first device should transition to the insecure state. For example, the security engine 270 of the second device may change a locally stored indication of a shared security state or of a local security state in response to the indicating from the first device.

Figure 5:
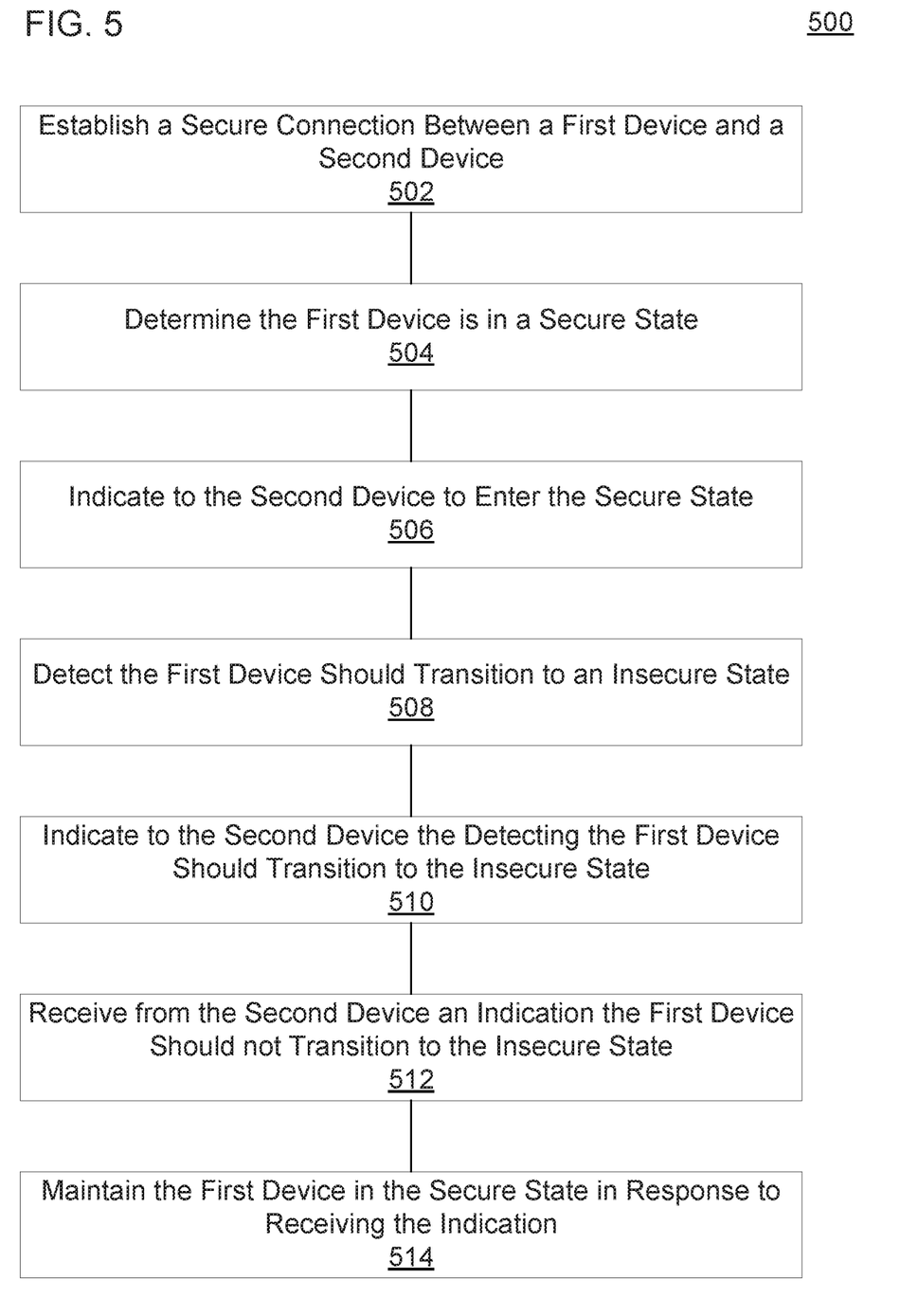
FIG. 5 is a flow diagram of still another example method to manage a shared security state.

FIG. 5 is a flow diagram of still another example method 500 to manage a shared security state. A processor may perform elements of the method 500. For illustrative purposes, the method 500 is described in connection with the devices of FIG. 2. However, other devices may perform the method in other examples. At block 502, the method 500 may include establishing a secure connection between a first device and a second device. For example, the connection engine 210 may establish the secure connection in any of the manners previously discussed. At block 504, the method 500 may include determining the first device is in a secure state. For example, the security engine 220 may determine the first device is in a secure state in any of the manners previously discussed.

At block 506, the method 500 may include indicating to the second device to enter the secure state based on the determining the first device is in the secure state. For example, the security engine 220 may cause the connection engine 210 to indicate to the second device to enter the secure state in any of the manners previously discussed. At block 508, the method 500 may include detecting the first device should transition to an insecure state. For example, the security engine 220 may detect the first device should transition in any of the manners previously discussed. At block 510, the method 500 may include indicating to the second device the detecting the first device should transition to the insecure state. For example, the security engine 220 may indicate the detecting to the second device in any of the manners previously discussed.

Block 512 may include receiving from the second device an indication the first device should not transition to the insecure state in response to the indicating to the second device the detecting the first device should transition to the insecure state. For example, the remote security engine 270 may determine the devices 205, 255 should remain in the secure state and cause the remote connection engine 260 to transmit an indication that the first device should not transition or the reason the first device should not transition to the local connection engine 210. The local connection engine 210 may receive the indication or the reason. At block 514, the method 500 may include maintaining the first device in the secure state in response to receiving the indication. For example, the security engine 220 may leave a locally stored indication of the local security state or the shared security state unchanged, may revert a stored indication (e.g., a stored indication changed at block 508), or the like.

Figure 6:
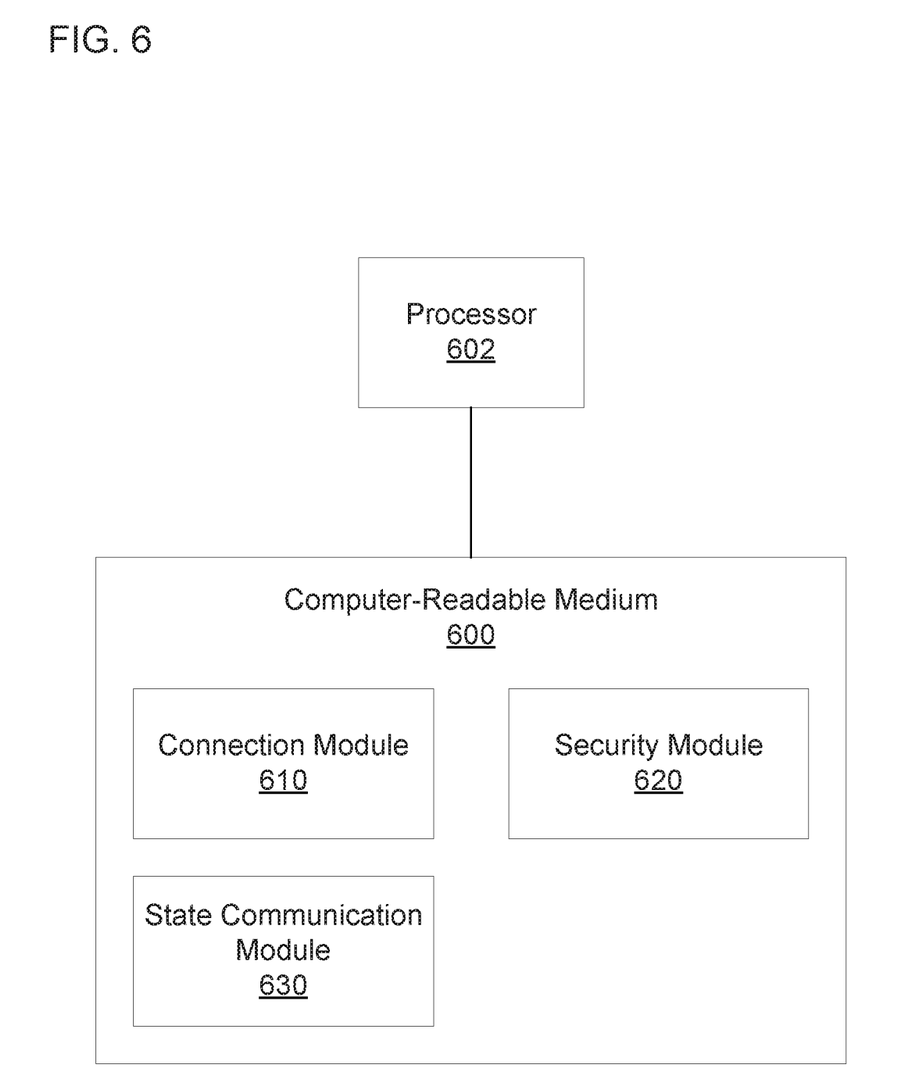
FIG. 6 is a block diagram of an example computer-readable medium including instructions that cause a processor to manage a shared security state.

FIG. 6 is a block diagram of an example computer-readable medium 600 including instructions that, when executed by a processor 602, cause the processor 602 to manage a shared security state. The computer-readable medium 600 may be a non-transitory computer-readable medium, such as a volatile computer-readable medium (e.g., volatile RAM, a processor cache, a processor register, etc.), a non-volatile computer-readable medium (e.g., a magnetic storage device, an optical storage device, a paper storage device, flash memory, read-only memory, non-volatile RAM, etc.), and/or the like. The processor 602 may be a general-purpose processor or special purpose logic, such as a microprocessor (e.g., a central processing unit, a graphics processing unit, etc.), a digital signal processor, a microcontroller, an ASIC, an FPGA, a programmable array logic (PAL), a programmable logic array (PLA), a programmable logic device (PLD), etc.

The computer-readable medium 600 may include a connection module 610, a security module 620, and a state communication 630. As used herein, a "module" (in some examples referred to as a "software module") is a set of instructions that when executed or interpreted by a processor or stored at a processor-readable medium realizes a component or performs a method. The connection module 610 may include instructions that, when executed, cause the processor 602 to determine a secure connection has been established with a remote device. For example, the connection module 610 may cause the processor 602 to confirm that an encrypted channel remains established with the remote device, to establish an encrypted channel with the remote device, or the like.

The security module 620 may cause the processor 602 to determine a local version of a shared security state based on a security state of the remote device. For example, the security module 620 may cause the processor 602 to select a shared security state based on a local security state or the remote security state. The security module 620 may cause the processor 602 to select the least secure state as the shared security state, to evaluate the reasons for the security state at each device, or the like to select the shared security state. The security module 620 may cause the processor 602 to store an indication of the shared security state that was selected.

The state communication module 630 may cause the processor 602 to receive an indication from the remote device that a remote version of the shared security state has changed. For example, the remote device may have determined that a change to the shared security state should occur, and the remote device may transmit an indication of the change to the shared security state that should occur. The state communication module 630 may cause the processor 602 to receive the transmitted indication. The state communication module 630 may also cause the processor 602 to receive an indication of the reason the shared security state has changed.

The security module 620 may cause the processor 602 to update the local version of the shared security state based on the received indication. For example, the security module 620 may cause the processor 602 to modify a stored indication of the shared security state based on the received indication. In some examples, the received indication may specify a change to occur to the shared security state, and the security module 620 may cause the processor 602 to make the specified change to the stored indication of the shared security state. In an example, when executed by the processor 602, the connection module 610 may realize the connection engine 110 of FIG. 1, the security module 620 may realize the security engine 120, and the state communication module 630 may realize the connection engine 110 or the security engine 120.

Figure 7:
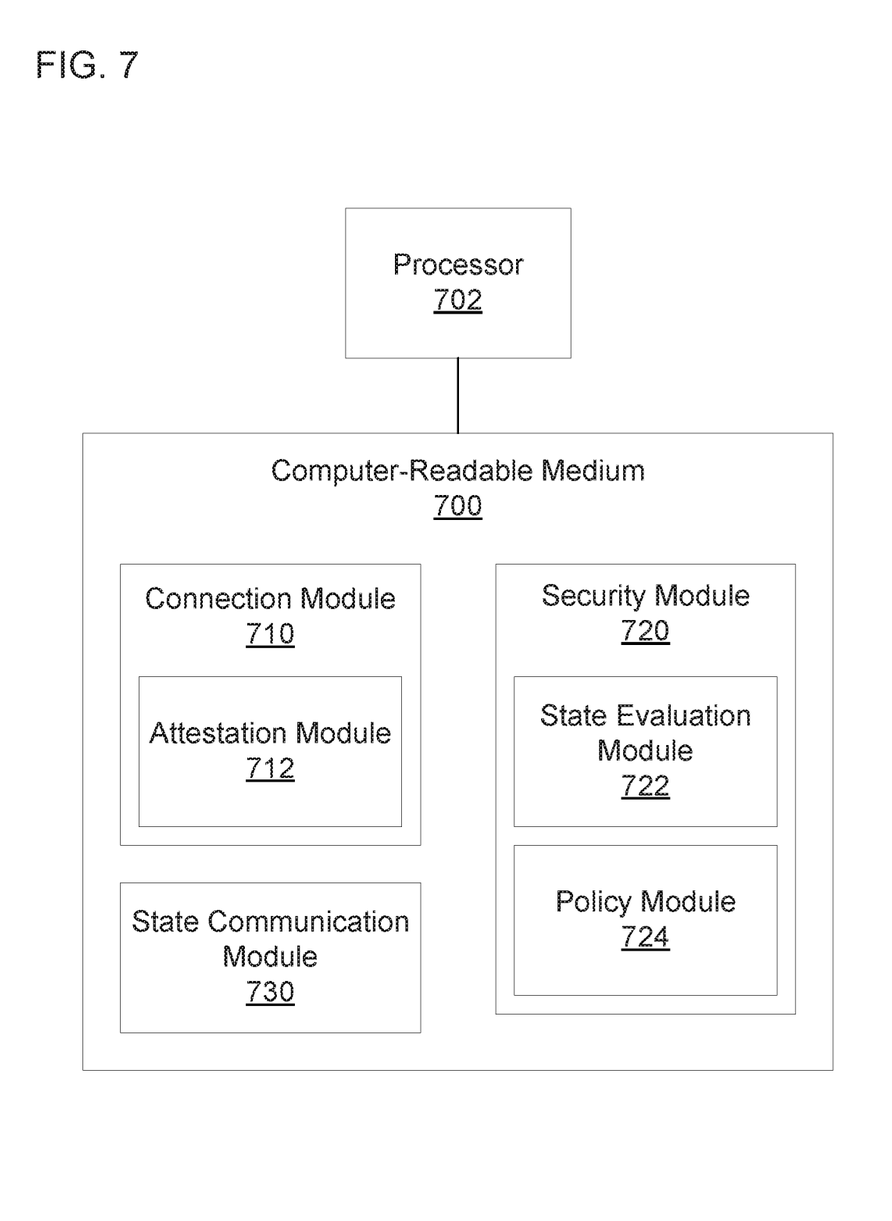
FIG. 7 is a block diagram of another example computer-readable medium including instructions that cause a processor to manage a shared security state.

FIG. 7 is a block diagram of an example computer-readable medium 700 including instructions that, when executed by a processor 702, cause the processor 702 to manage a shared security state. The computer-readable medium 700 may include a connection module 710, an attestation module 712, a security module 720, a state evaluation module 722, a policy module 724, and a state communication module 730.

The connection module 710 may include instructions that, when executed, cause the processor 702 to determine a secure connection has been established with a remote device, for example, in any of the manners previously discussed. The connection module 710 may include an attestation module 712. The attestation module 712 may cause the processor 702 to receive an attestation of capabilities or a configuration of the remote device. For example, the attestation module 712 may cause the processor 702 to request the attestation, to receive the attestation without request (e.g., as specified by a protocol for establishing the secure connection), or the like.

The security module 720 may cause the processor 702 to determine a local version of a shared security state based on a security state of the remote device, for example, in any of the manners previously discussed. The state communication module 730 may cause the processor 702 to receive an indication from the remote device that a remote version of the shared security state has changed, for example, in any of the manners previously discussed. The security module 720 may cause the processor 702 to update the local version of the shared security state based on the received indication, for example, in any of the manners previously discussed.

The security module 720 may include a state evaluation module 722. In some examples, the state evaluation module 722 may cause the processor 702 to decide whether to change a local security state based on the update to the local version of the shared security state. In some examples, the state evaluation module 722 may cause the processor 702 to decide whether to update the local version of the shared security state based on the received indication (or whether to indicate to the remote device to revert the change to the remote version of the shared security state).

The security module 720 may include a policy module 724 to store a security policy. The security policy may apply to the local device and not apply to the remove device or may apply to both devices. The state evaluation module 722 may cause the processor 702 to decide whether to change the local security state based on the security policy and the update to the local version of the shared security state. For example, the security policy may specify the conditions under which a change to the local version of the shared security state should result in a change to the local security state. In some examples, the state communication module 730 may cause the processor 702 to receive an indication of the reason for the change in the remote version of the shared security state. The state evaluation module 722 may cause the processor 702 to evaluate whether the reason for the change of the remote version of the shared security state should result in a change to the local security state, for example, based on the security policy. Referring to FIG. 2, in an example, when executed by the processor 702, the connection module 710, the attestation module 712, or the state communication module 730 may realize the connection engine 210, and the security module 720, the state evaluation module 722, the policy module 724, or the state communication module 730 may realize the security engine 220.

The above description is illustrative of various principles and implementations of the present disclosure. Numerous variations and modifications to the examples described herein are envisioned. Accordingly, the scope of the present application should be determined only by the following claims.

The invention claimed is:

1. A first device comprising:
a connection engine to establish a secure connection with a second device; and
a security engine to:
determine a shared security state for the first device and the second device based on a security state of the first device and a security state of the second device,
detect a change in the security state of the first device should occur,
change the shared security state at the first device in response to the detection the change in the security state of the first device should occur, and
indicate to the second device the change in the shared security state at the first device,
wherein the connection engine is to receive a multifactor authentication request,
wherein the security engine is to confirm the secure connection remains established and the shared security state is in a secure state, and
wherein the security engine is to respond to the multifactor authentication request without user input based on the confirming.

2. The first device of claim 1, wherein the connection engine is to establish the secure connection directly with the second device over a short-range wireless communication protocol.

3. The first device of claim 1, wherein the connection engine is to detect a loss of the secure connection with the second device, and wherein the security engine is to change the shared security state to indicate the loss of the secure connection and to select a security state of the first device.

4. The first device of claim 1, wherein the connection engine is to receive an indication from the second device to not change the shared security state in response to indicating to the second device the change in the shared security state at the first device, and wherein the security engine is to revert the change to the shared security state at the first device.

5. The first device of claim 1, wherein, for the security engine to respond to the multifactor authentication request without user input, the security engine is to:
receive, from the second device, a response to be provided to a service that provided the first device with the multifactor authentication request; and
transmit the response to the service.

6. A method, comprising:
establishing a secure connection between a first device and a second device;
determining the first device is in a secure state;
indicating, over the secure connection, to the second device to enter the secure state based on the determining the first device is in the secure state;
receiving, by the first device, a multifactor authentication request;
confirming, by the first device, that the secure connection remains established and that a shared security state of the first device and the second device is in a secure state;
responding to the multifactor authentication request without user input based on the confirming;
detecting the first device should transition from the secure state to an insecure state; and
indicating, over the secure connection, to the second device the detecting the first device should transition from the secure state to the insecure state.

7. The method of claim 6, further comprising transitioning the second device to the insecure state based on the indicating to the second device the detecting the first device should transition to the insecure state.

8. The method of claim 6, wherein detecting the first device should transition comprises detecting the first device is no longer in a user's pocket, detecting a user is no longer visible by a camera, or detecting a lack of user activity.

9. The method of claim 6, wherein determining the first device is in the secure state comprises receiving user input and authenticating a user based on the user input.

10. The method of claim 6, further comprising receiving from the second device an indication the first device should not transition to the insecure state in response to the indicating to the second device the detecting the first device should transition to the insecure state, and maintaining the first device in the secure state in response to receiving the indication.

11. The method of claim 6, wherein the secure state of the first device is an unlocked state of the first device and the insecure state of the first device is a locked state of the first device.

12. The method of claim 6, further comprising:
to respond to the multifactor authentication request without user input:
receiving, from the second device, a response to be provided to a service that provided the first device with the multifactor authentication request; and
transmitting the response to the service.

13. A non-transitory computer-readable medium comprising instructions that, when executed by a processor, cause the processor to:
determine a secure connection has been established with a remote device;
determine a local version of a shared security state based on a security state of the remote device;
receive an indication from the remote device that a remote version of the shared security state has changed;
update the local version of the shared security state based on the received indication; and
decide whether to change a local security state based on a security policy and the update to the local version of the shared security state.

14. The computer-readable medium of claim 13, wherein the security policy does not apply to the remote device.

15. The computer-readable medium of claim 13, wherein the instructions to cause the processor to determine a secure connection has been established with the remote device include instructions to receive an attestation of capabilities or a configuration of the remote device.

16. The computer-readable medium of claim 13, wherein the security policy specifies conditions under which a change to the local version of the shared security state should result in a change to the local security state.

* * * * *